United States Patent [19]

Cahen

[11] 4,188,333

[45] Feb. 12, 1980

[54] PROCESS FOR SELECTIVELY HYDROGENATING POLYENIC COMPOUNDS IN OILS

[76] Inventor: Raymond M. Cahen, 21, avenue Commandant Lothaire, 1040 Brussels, Belgium

[21] Appl. No.: 845,061

[22] Filed: Oct. 25, 1977

[30] Foreign Application Priority Data

Jan. 18, 1977 [LU] Luxembourg .......................... 76591

[51] Int. Cl.$^2$ .......................... C11C 3/12; B01J 23/40

[52] U.S. Cl. ...................................... 260/409; 252/472

[58] Field of Search .......................... 260/409; 252/472

[56] References Cited

U.S. PATENT DOCUMENTS

| | | | |
|---|---|---|---|
| 3,498,927 | 3/1970 | Stiles | 252/472 |
| 3,743,662 | 7/1973 | Eurlings et al. | 260/409 |
| 4,073,750 | 2/1978 | Yates et al. | 252/472 |

FOREIGN PATENT DOCUMENTS

| | | |
|---|---|---|
| 993979 | 6/1965 | United Kingdom . |
| 1140264 | 1/1969 | United Kingdom . |
| 1154148 | 6/1969 | United Kingdom . |
| 1203066 | 8/1970 | United Kingdom . |

*Primary Examiner*—John F. Niebling

*Attorney, Agent, or Firm*—Schwartz, Jeffery, Schwaab, Mack, Blumenthal & Koch

[57] ABSTRACT

A process for selectively hydrogenating polyenic compounds in oils, especially edible oils containing esters of polyenic fatty acids is disclosed, wherein the formation of saturated compounds and trans isomers is low. The process comprises hydrogenating said oils in the presence of a catalyst comprising nickel on a titanium oxide carrier, wherein the per weight ratio nickel:carrier is between about 1.5 and about 4.5.

13 Claims, No Drawings

PROCESS FOR SELECTIVELY HYDROGENATING POLYENIC COMPOUNDS IN OILS

BACKGROUND OF THE INVENTION

This invention relates to a process for a selective hydrogenation of unsaturated oils, especially edible oils, by which the content in highly unsaturated compounds is strongly reduced with a minimum formation of solid products.

Edible oils essentially consist of esters, mainly glycerides, of various fatty acids, a portion of which is unsaturated and may contain 1, 2, 3 or more double bonds. For example, some vegetable oils, such as soyabean oil, sunflower oil, rapeseed oil, or corn oil, contain compounds having several double bonds (polyenic compounds), for instance, compounds having three double bonds (trienic compounds), and compounds having two double bonds (dienic compounds), together with compounds having only one double bond (monoenic compounds), and with saturated compounds. For example, soyabean oil contains triglycerides of the following acids: about 6 to 10% by weight of linolenic acid (a fatty acid containing 18 carbon atoms and 3 carbon-to-carbon double bonds) about 50% of linoleic acid (a fatty acid containing 18 carbon atoms and 2 double bonds), oleic acid (a fatty acid containing 18 carbon atoms and 1 double bond) and saturated acids (stearic and palmitic acids).

In order to increase the stability of these oils, it is necessary to substantially reduce the content in linolenic acid esters and to partly reduce the content in esters of dienic acids. However, for some uses of these oils, for instance, for their use in foods, e.g., as cooking oil for food, it is important to ensure a certain content in monoenic esters. Reducing the content of polyenic compounds is generally effected by hydrogenation. Yet, in order to avoid or at least partly avoid the formation of solid products and to provide for sufficient monoenic compounds this hydrogenation should be incomplete and selective. In this respect, it is extremely important to limit the formation of saturated compounds, that is, to selectively hydrogenate the polyenic compounds to dienic and monenic compounds, and to limit the formation of trans isomers, which have a melting point higher than the melting point of the cis isomers. Hydrogen treatment usually leads to the formation of these trans isomers, and thus, to the formation of solid hydrogenated oils.

It has already been suggested to carry out a selective hydrogenating treatment of oils in the presence of copper catalysts. However, these catalysts have some disadvantages. For instance, the presence, even of traces, of these catalysts in the hydrogenated products must be avoided because copper induces the oxidation of these products. Moreover, copper catalysts are far less active than nickel catalysts. On the other hand, hydrogenation in the presence of a conventional nickel catalyst is less selective and the amount of solid products resulting from such a hydrogenation is too high.

SUMMARY OF THE INVENTION

It is an object of the present invention to provide a new and improved process for selectively hydrogenating highly unsaturated, especially polyenic, compounds in edible oils.

It is a further object of the present invention to provide such a process, wherein the formation of saturated compounds is low. It is a further object of the present invention to provide such a process, wherein the formation of trans isomers is low.

It is a further object of the present invention to provide such a process, wherein the formation of solid products is low.

It is a further object of the present invention to provide such a process, wherein the formation of compounds with conjugated double bonds is avoided.

It is a further object of the present invention to provide such a process, whereby the iodine value of the hydrogenated product is reduced for about 10 to about 40 units.

It is a further object of the present invention to provide such a process, which permits hydrogenation of edible oils without using a catalyst, which affects the stability of the hydrogenated product.

In order to accomplish the foregoing objects according to the present invention, there is provided a process for selectively hydrogenating polyenic compounds in oils, especially edible oils and vegetable oils which contain esters of polyenic fatty acids, comprising the step of hydrogenating said oil in the presence of a catalyst comprising nickel on a titanium oxide carrier wherein the per weight ratio of nickel:carrier is between about 1.5 and about 4.5.

With the process of the present invention, the hydrogenation of edible oils is particularly selective, the yield in hydrogenated products is high, and the reaction rate is remarkably high.

According to the present invention, there is further provided a catalyst for selectively hydrogenating polyenic compounds, which comprises nickel on a titanium oxide carrier wherein the per weight ratio of nickel:carrier is between about 1.5 and about 4.5.

DETAILED DESCRIPTION OF THE INVENTION

For obtaining stable oily hydrogenated products the iodine value of the starting oil, (for example, for soyabean oil, this value may vary within a range of about 120 to 140), must be decreased for about 10 to about 40 units during the hydrogenation. Moreover, the content of polyenic compounds in the hydrogenated oil should not exceed 2%, and the amount of newly formed saturated products and trans isomers must be kept at a minimum. Furthermore, the formation of compounds having conjugated double bonds, which are unstable, should be avoided.

The conditions can be achieved with the process according to the present invention wherein the hydrogenation is carried out in the presence of a catalyst comprising nickel on titanium dioxide as a carrier. This catalyst may be prepared by any known method, for example, by dissolving nickel nitrate in water, mixing the solution with $TiO_2$, and then precipitating nickel, for instance, as nickel carbonate, and then washing, drying and calcining the precipitate, and then reducing the nickel, e.g., by means of hydrogen. The catalysts which are prepared by this way contain at least 90% of nickel as metallic nickel, the rest being nickel oxide. Generally, the per weight ratio between the total amount of nickel (Ni+NiO) and the carrier is between about 1.5 and about 4.5, and especially between about 2 and about 3.

Since metallic nickel has pyrophoric properties, it is desirable to protect the catalyst during its storage. Any known method may be used, such as impregnation of the catalyst with an oily, inert product, for instance, with paraffinic oil or with stearine. Another method consists in oxidizing the catalyst on the surface.

The amount of catalyst which is used for the selective hydrogenation depends on many factors, namely on the kind of starting oil, on its purity, on the catalyst composition, and on the working conditions. In an advantageous embodiment of the invention, the catalyst is used in an amount corresponding to from about 0.01 to about 0.75% of total nickel based on the weight of the starting oil. In this way, the reaction rate and the selectivity of the hydrogenation reaction are high, and the decrease of the iodine value of the oil is between about 10 and about 40 units. Higher amounts of catalyst could be used, but without any economic advantage.

The hydrogenation is carried out at a hydrogen pressure which may be varied within wide limits. Generally, a gauge pressure in the range of from 0.5 to 10 kg/cm$^2$ is particularly suitable in order to obtain hydrogenated oils, which fulfill the above mentioned requirements. The reaction temperature may be between about 125° and about 175° C. In an advantageous embodiment of the invention, the hydrogenation is performed at a hydrogen gauge pressure of between about 0.5 and about 7 kg/cm$^2$ and at a temperature of about 130° to about 150° C.

The following examples illustrate the present invention without limiting it.

Example 1

10 Liters of soybean oil are introduced into a cylindrical reactor with a capacity of 20 liters and are heated to 135° C. under nitrogen.

Subsequently the catalyst, a suspension of a fine powder in warm soybean oil, is introduced into the reactor. Then the pressure in the reactor is increased to 3 kg/cm$^2$ by introducing hydrogen, at a flow rate of 4 m$^3$/hr. The temperature increases to 140° C. due to the exothermicity of the reaction, and this temperature is maintained during the hydrogenation.

The reaction is stopped when the iodine value of the hydrogenated soybean oil is 100.

The catalyst, which is prepared from a solution of nickel nitrate and rutile, is calcined at 350° C. and then reduced at 300° C. in a hydrogen stream. In this catalyst, the per weight ratio between nickel (97.1% as metallic nickel and 2.9% as nickel oxide) and titanium oxide (rutile) as carrier is 2.5. The catalyst is used in an amount corresponding to 0.1% of nickel, based on the weight of the treated oil.

Hydrogenated soybean oil having an iodine value of 100 is obtained after 53 minutes of hydrogenation. This hydrogenated oil contains only 0.94% by weight of solid products (determination at 20° C.).

For the analysis, a transesterification of the oil with methanol is first carried out in a conventional manner and then the methyl esters are separated by chromatography, in order to determine the composition and the proportions of the acids. The determination of the amount of trans-isomers is carried out by infra-red spectrometry, the characteristic peak being at 10.3μ. The intensity of this peak is compared with the intensity of the peak of the methyl ester of elaidic acid (trans-isomer of the acid having a straight chain with 18 carbon atoms and containing one double bond C═C).

The data from the analyses of the starting material and of the hydrogenated oil are given in the following Table (percentages by weight).

| Acid Components | Starting Oil | Hydrogenated Oil |
|---|---|---|
| $C_{16}$: 0 (a) | 10.2% | 10.1% |
| $C_{18}$: 0 | 4.2% | 6.0% |
| $C_{18}$: 1 | 22.0% | 49.8% |
| $C_{18}$: 2 | 55.6% | 31.8% |
| $C_{18}$: 3 | 7.2% | 1.0% |
| Trans-isomers | — | 18.5% |
| Conjugated dienes | 0.24% | 0.38% |
| Iodine value | 131 | 100 |

(a) : index 0, 1, 2 or 3 means the number of double bonds C = C.

By way of comparison, a similar experiment is carried out, but a catalyst containing nickel on kieselguhr as carrier is used.

The hydrogenated oil contains 6.47% by weight of solid products (at 20° C.) and 9.1% of $C_{18}$: 0 acid components.

Example 2

The experiment described in Example 1 is repeated, but with a catalyst having a weight ratio between nickel (90.5% as metallic nickel and 9.5% as nickel oxide) and $TiO_2$ (anatase) of 2.5.

The hydrogenated oil contains only 1.2% by weight of solid products (at 20° C.). This hydrogenated oil has an iodine value of 100 and the composition of its acid content is the following:

| | |
|---|---|
| $C_{16}$: 0 | 10.2% by weight |
| $C_{18}$: 0 | 6.2% by weight |
| $C_{18}$: 1 | 49.1% by weight |
| $C_{18}$: 2 | 32.5$ by weight |
| $C_{18}$: 3 | 1.0% by weight |
| Trans-isomers: | 16.5% by weight |

Example 3

Soybean oil is hydrogenated as described in Example 1, but the working conditions are the following:

| | |
|---|---|
| Temperature | 145° C. |
| Gauge pressure of $H_2$: | 0.5 kg/cm$^2$ |
| Catalyst concentration: | 0.5% Ni based on the weight of the oil |
| Reaction time: | 42 minutes |

The results of the analysis of the hydrogenated oil are the following:

Composition of acid contents:

| | |
|---|---|
| $C_{16}$: 0 | 10.2% by weight |
| $C_{18}$: 0 | 5.3% by weight |
| $C_{18}$: 1 | 43.5% by weight |
| $C_{18}$: 2 | 37.4% by weight |
| $C_{18}$: 3 | 1.9% by weight |
| Trans isomers | 13.0% by weight |
| Iodine value | 108 |
| Solid products (at 20° C.): | 0.8% by weight. |

Example 4

Rapeseed oil with a low content of erucic oil is hydrogenated as described in Example 1, in the presence of a catalyst containing nickel (93.2% as metallic nickel and 6.8% as nickel oxide) and $TiO_2$ (rutile), the weight ratio nickel:$TiO_2$ being 3.5.

The working conditions are:

| | |
|---|---|
| Temperature | 135° C. |
| Gauge pressure of $H_2$: | 6.5 kg/cm$^2$ |
| Catalyst concentration: | 0.04% Ni, based on the weight of the oil |
| Reaction time: | 23 minutes. |

The results of the analyses of the starting oil and of the hydrogenated oil were the following:

| | Starting oil | Hydrogenated oil |
|---|---|---|
| Iodine value | 114 | 95 |
| Composition of acid contents: | | |
| $C_{16}$: 0 | 3.9% | 3.9% |
| $C_{16}$: 1 | 0.2% | 0.2% |
| $C_{18}$: 0 | 1.6% | 3.5% |
| $C_{18}$: 1 | 50.2% | 59.9% |
| $C_{18}$: 2 | 20.6% | 15.7% |
| $C_{18}$: 3 | 9.1% | 1.8% |
| $C_{20}$: 0 | 0.5% | 0.6% |
| $C_{20}$: 1 | 4.4% | 4.3% |
| $C_{22}$: 0 | 0.3% | 0.4% |
| $C_{22}$: 1 | 7.7% | 7.6% |
| Trans isomers | | 14.5% |

While the invention has now been described in terms of certain preferred embodiments, and exemplified with respect thereto, the skilled artisan will appreciate that various modifications, changes, substitutions, and omissions may be made without departing from the spirit thereof. Accordingly, it is intended that the scope of the present invention be limited solely by that of the following claims.

What is claimed is:

1. A process for selectively hydrogenating oils containing polyenic compounds into oils wherein the content of polyenic compounds is reduced with a minimum formation of solid products, which comprises the step of hydrogenating said oil in the presence of a catalyst comprising nickel on a titanium oxide carrier, wherein the per weight ratio of nickel:carrier is between about 1.5 and about 4.5.

2. The process as defined in claim 1, wherein said oil contains a major portion of esters of polyenic fatty acids.

3. The process as defined in claim 1, wherein said oil is an edible oil.

4. The process as defined in claim 1, wherein said oil is a vegetable oil.

5. The process as defined in claim 1, wherein the per weight ratio nickel:carrier is between about 2 and about 3.

6. The process as defined in claim 1, wherein the catalyst is used in an amount corresponding to between about 0.01 and about 0.75% by weight nickel, based on the treated oil.

7. The process as defined in claim 1, wherein the hydrogenation is carried out at a temperature between about 125° and about 175° C.

8. The process as defined in claim 7, wherein the temperature is between about 130° and about 150° C.

9. The process as defined in claim 1, wherein the hydrogenation is carried out at a hydrogen gauge pressure of between about 0.5 and about 10 kg/cm2.

10. The process as defined in claim 9, wherein the hydrogen gauge pressure is between about 0.5 and about 7 kg/cm2.

11. The process as defined in claim 1, which further comprises the step of recovering a partly hydrogenated oil from the reaction mixture.

12. The process as defined in claim 11, wherein the partly hydrogenated oil has an iodine value which is about 10 to about 40 units less than the iodine value of the starting oil.

13. A selective, partial hydrogenation catalyst for selective, partial hydrogenation of oils comprising nickel on a carrier consisting essentially of titanium oxide, wherein the per weight ratio of nickel:carrier is about 1.5 to about 4.5, at least 90% of said nickel being metallic nickel, said catalyst selectively catalyzing partial hydrogenation of oils containing polyenic compounds to stable liquid oils containing a high proportion of monoenic compounds and a minimum of solid products.

* * * * *